United States Patent
Bunel et al.

(10) Patent No.: US 11,248,793 B2
(45) Date of Patent: Feb. 15, 2022

(54) COMBUSTION CHAMBER HAVING A DOUBLE CHAMBER BOTTOM

(71) Applicant: Safran Aircraft Engines, Paris (FR)

(72) Inventors: Jacques Marcel Arthur Bunel, Moissy-Cramayel (FR); Dan-Ranjiv Joory, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 0 days.

(21) Appl. No.: 16/976,354

(22) PCT Filed: Feb. 28, 2019

(86) PCT No.: PCT/FR2019/050467
§ 371 (c)(1),
(2) Date: Aug. 27, 2020

(87) PCT Pub. No.: WO2019/166745
PCT Pub. Date: Sep. 6, 2019

(65) Prior Publication Data
US 2021/0140639 A1     May 13, 2021

(30) Foreign Application Priority Data
Feb. 28, 2018  (FR) ...................................... 1851784

(51) Int. Cl.
| F23R 3/00 | (2006.01) |
| F23R 3/28 | (2006.01) |
| F02C 7/232 | (2006.01) |

(52) U.S. Cl.
CPC .............. *F23R 3/283* (2013.01); *F02C 7/232* (2013.01); *F23R 3/002* (2013.01); *F05D 2220/32* (2013.01); *F05D 2240/35* (2013.01)

(58) Field of Classification Search
None
See application file for complete search history.

(56) References Cited

U.S. PATENT DOCUMENTS

| 5,623,827 | A | 4/1997 | Monty |
| 6,164,074 | A | 12/2000 | Madden et al. |
| 2007/0186558 | A1* | 8/2007 | De Sousa ................. F23R 3/50 60/804 |
| 2014/0090402 | A1 | 4/2014 | Erbas-Sen et al. |
| 2014/0318138 | A1* | 10/2014 | Bunel ..................... F23R 3/283 60/752 |
| 2015/0107109 | A1 | 4/2015 | Corsmeier et al. |
| 2018/0363903 | A1* | 12/2018 | Dziech ..................... F23R 3/60 |

FOREIGN PATENT DOCUMENTS

| EP | 1 818 615 A1 | 8/2007 |
| EP | 2 012 061 A1 | 1/2009 |
| EP | 2 012 062 A1 | 1/2009 |
| FR | 2 998 038 A1 | 5/2014 |
| GB | 2 247 522 A | 3/1992 |

* cited by examiner

*Primary Examiner* — Edwin Kang
(74) *Attorney, Agent, or Firm* — Blank Rome LLP

(57) ABSTRACT

A gas turbo machine having a combustion chamber. The combustion chamber includes a chamber bottom having an upstream wall and a downstream wall extending between inner and outer annular walls. Each upstream and downstream walls each having openings for mounting fuel injection devices for injecting fuel through said openings. The downstream wall is sectorised.

15 Claims, 4 Drawing Sheets

COMBUSTION CHAMBER HAVING A DOUBLE CHAMBER BOTTOM

CROSS REFERENCE TO RELATED APPLICATIONS

Figure 1:
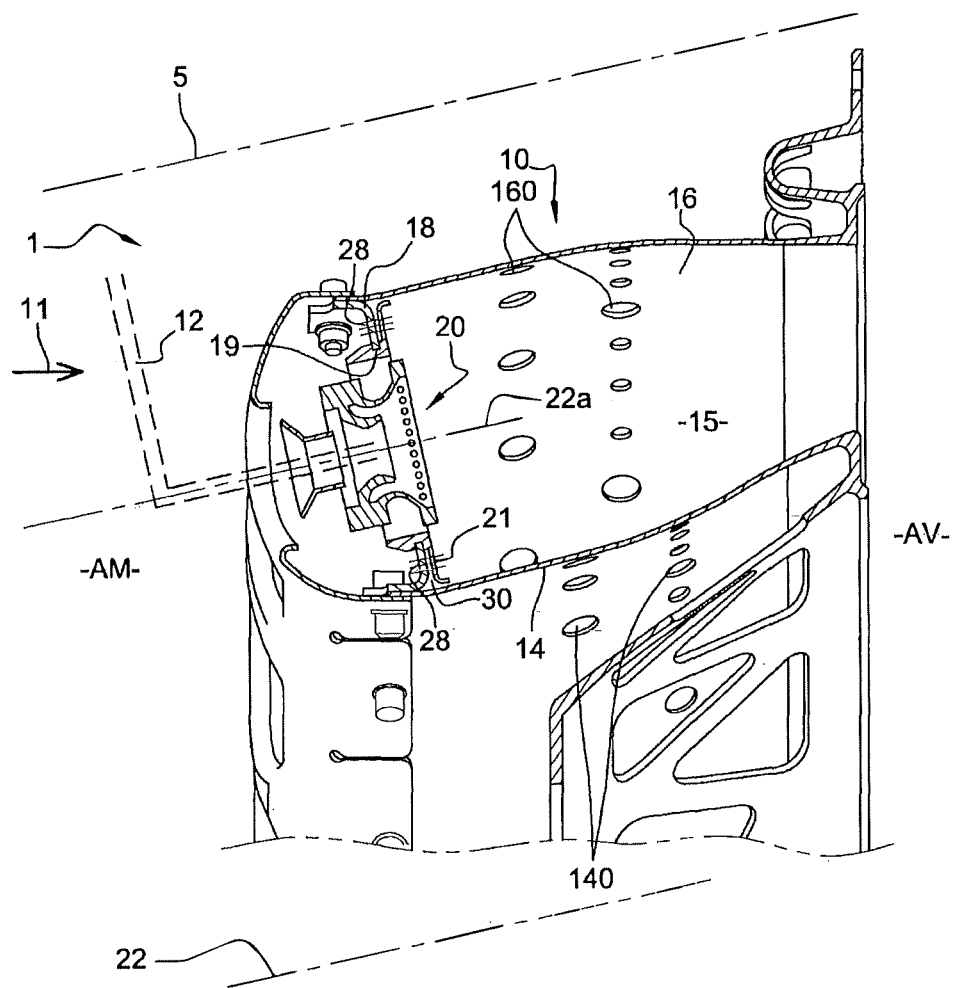

This application is a national phase of PCT/FR2019/050467, filed Feb. 28, 2019, which claims the benefit of French Application No. 1851784, filed Feb. 28, 2018, the subject matter of each of which are incorporated by reference herein in their entirety.

PRESENTATION

The present invention relates to a combustion chamber for a gas turbomachine, such as, for instance, an aircraft turbojet engine or a turboprop engine.

In this field combustion chambers are known with:
two walls, respectively a (radially) inner wall and a (radially) outer wall, and
a chamber bottom (BCC, bottom of the combustion chamber) comprising an upstream wall and a downstream wall extending between said inner and outer walls and each including mounting openings (i.e. configured to allow mounting) for fuel injection devices to inject fuel through said openings.

FR 2 998 038 discloses such a combustion chamber.

The space or enclosure between the upstream and downstream chamber bottom walls is supplied with air via multi-perforation holes to ensure impact cooling of the downstream wall, which is directly exposed to flame radiation. Air is then ejected through slots or holes towards the inner and outer walls to initiate an air film which is then relayed through the multi-perforation holes in these walls.

The downstream wall of the chamber bottom which is directly exposed to radiation in this configuration is thus subjected to strong thermal stresses which will, over the course of the operating cycles, deform it and no longer allow it to satisfactorily perform its main function with regard to the upstream wall, especially since it is frequent to protect the chamber bottom thermally by a ring of pressure baffles mounted in the chamber, directly downstream of the bottom wall. Without such baffles or sufficient thermal resistance over time of the downstream wall, the bottom of the chamber is normally likely to (too) quickly see its integrity altered.

Clearance may appear, which generates problems of pollution, fuel consumption, and re-ignition of the chamber in case of extinction. The addition of a fail-safe safety system is also an inappropriate solution, which adds to the weight of the combustion chamber.

The purpose of the invention is therefore in particular to provide a simple, effective and economic solution to at least some of these problems and disadvantages, by aiming to achieve at least some of the following objectives in relation to the prior art, for example FR 2 998 038:
improved combustion chamber life, using double-skin BCC technology,
reduction of parasitic gas leaks in the equipped BCC,
reduction of pollution,
reduced fuel consumption,
improvement of the ignition and re-ignition conditions of the chamber,
increased ventilation on the part (downstream wall) directly exposed to flame radiation.

Therefore, it is proposed that the downstream bottom wall of the combustion chamber be sectorised, and that, for support on the upstream wall, the downstream wall include:
at an outer periphery, an annular flange facing upstream (called upstream facing annular flange), and
at an inner periphery, (such) an upstream facing annular flange.

Thus, by presenting both angularly successive sectors and upstream annular edges, such a downstream bottom wall will be able to deform and/or absorb stresses, independently of the upstream wall and from one angular sector to another.

In addition to, controlling certain deformations and/or absorbing stresses, such as the downstream wall, but also to facilitate the possible fixing of the two said upstream/downstream walls and the fuel injection devices fitted, it is proposed that the upstream wall should include:
at an outer periphery, an upstream facing annular flange for attachment to an upstream end of the outer wall, and
at an inner periphery, an upstream facing annular flange for attachment to an upstream end of the inner wall.

In order to stabilise, simplify and secure (not any through-fixing and welded connection, finally judged too uncertain, and sealing) the downstream wall can be mounted radially pre-stressed, thus ensuring a seal between the upstream annular edges of said respective downstream wall and upstream wall, at said inner and outer peripheries.

Alternatively, said upstream and downstream walls may be metallic and substantially cylindrical, which means cylindrical for at least some of said upstream wall and downstream wall, to within 10°.

Indeed, the above-mentioned sectorisation solution should make it possible to avoid manufacturing in CMC or other refractory material solutions.

Furthermore, this sectorisation solution must allow the sectorised downstream wall to define a thermal protection for the upstream wall, said upstream wall being structural for the combustion chamber, i.e. as the bottom wall through which the forces to be passed mainly between the bottom zone of the chamber and said inner and outer walls surrounding the area where the flames develop in the combustion chamber.

All the more so with a choice of structural upstream wall, it may be of interest that said upstream wall be screwed with the internal and external walls, respectively, the forces then passing through these screws.

In order to further enhance the above-mentioned advantages related to deformation and/or stress absorption, it is proposed that the downstream wall be supported under stress on the upstream wall.

In this way, there is no welding or brazing; and relative movements are all the more favoured with the sectorisation of the downstream wall.

In order to further promote thermal and mechanical resistance, it is also proposed that the upstream wall should have a thickness that is generally equal to, within 10%, or greater than the thickness of the downstream wall.

This refers to the mentioned choice of structural front wall and a shrink-wrapped/clamped assembly of the downstream wall to the front wall.

Again, to control relative movements involving the downstream wall and typically induced by thermal stresses, it is proposed that a said sector of the downstream wall overlap with a circumferentially adjacent sector of the downstream wall.

Thus, an expansion guidance can be achieved.

On this subject, it is even proposed that at least one circumferential deformation of said sectors of the downstream wall, considered individually and hot, be predefined (construction/manufacturing) and that the circumferential overlap by one said sector of an adjacent said sector of the downstream wall is then greater than said predefined deformation.

This will further reduce the risk of leaks and structural weakness.

For the mounting positions it is proposed:
that two said openings, respectively of said upstream wall and said downstream wall, for mounting a said fuel injection device are coaxial, each opening of the upstream wall having an axis with respect to which a said sector of the downstream wall will then be circumferentially (or angularly) centred, and/or
that the above-mentioned screw fastening holes of the upstream wall with the inner wall and outer wall are angularly located opposite the circumferential overlaps.

In this way, a balance will be promoted in the assembly but also in the foreseeable flow of forces and stresses.

When hot, with the turbomachine in operation, the upstream wall and the downstream wall sectors will experience different temperatures. If each downstream wall sector is centred on the axis of the mouth of each injection system, during operation, each downstream wall sector will radially follow the expansion of the upstream wall and expand tangentially. The external and internal diameters of the downstream wall crown can remain equal to those of the upstream wall and can thus improve the service life compared to a downstream wall—a priori annular—over 360°.

On this subject, to further promote thermal control of the bottom of the chamber, it is also proposed that the upstream wall and the downstream wall each include air passages (hereafter 139, 239, 243) that pass through them.

In addition to the combustion chamber just presented, the invention also relates to a gas turbomachine for an aircraft equipped with this combustion chamber.

Figure 2:
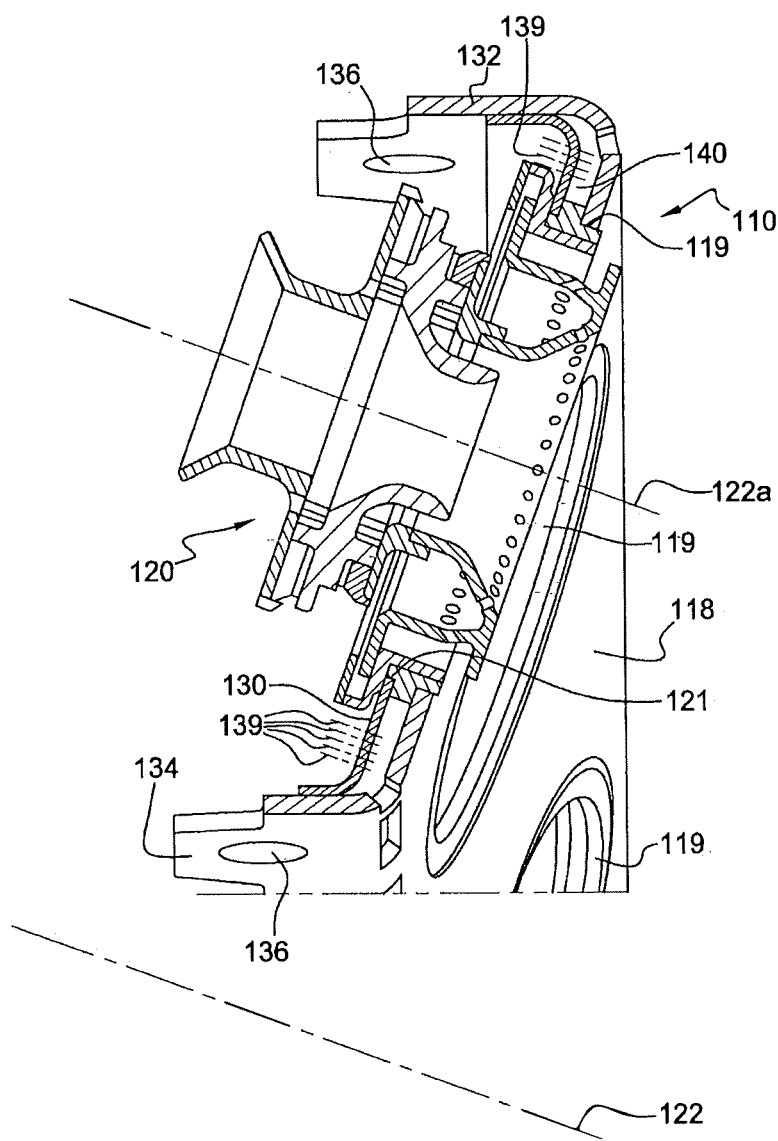
Figure 3:
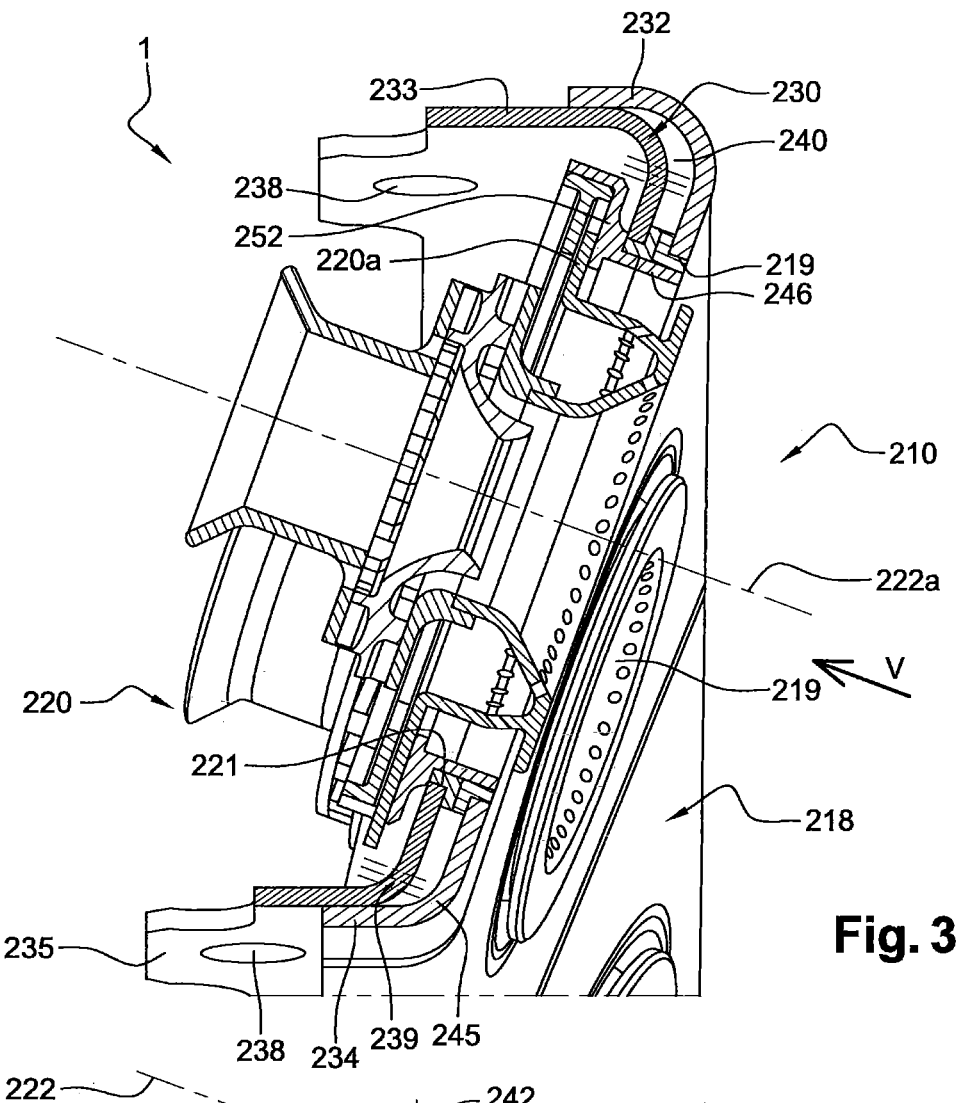
Figure 4:
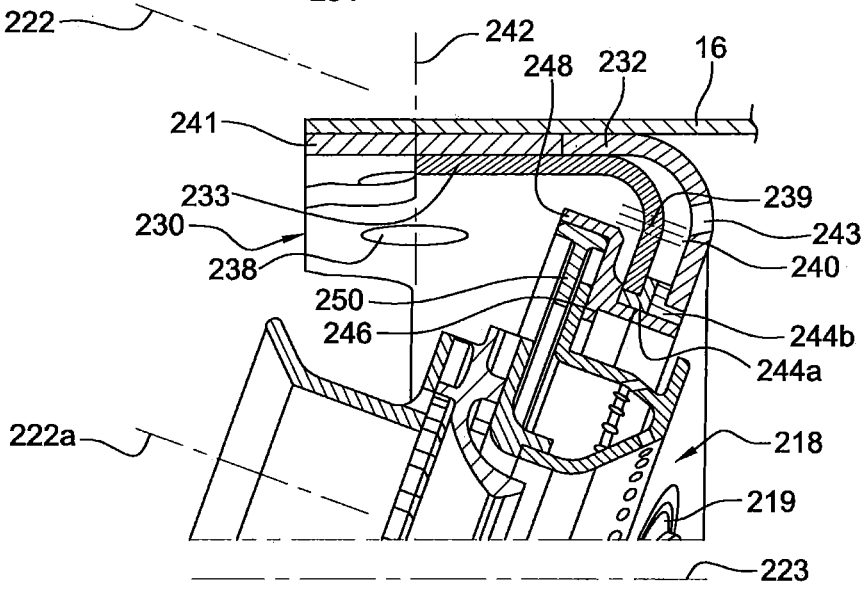
Figure 5:
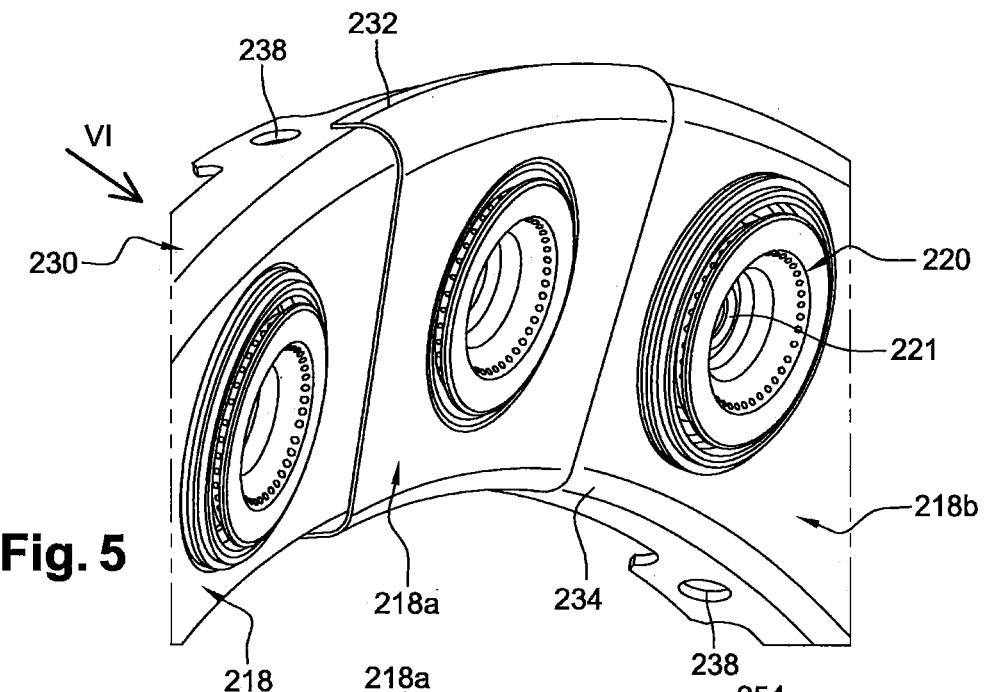
Figure 6:
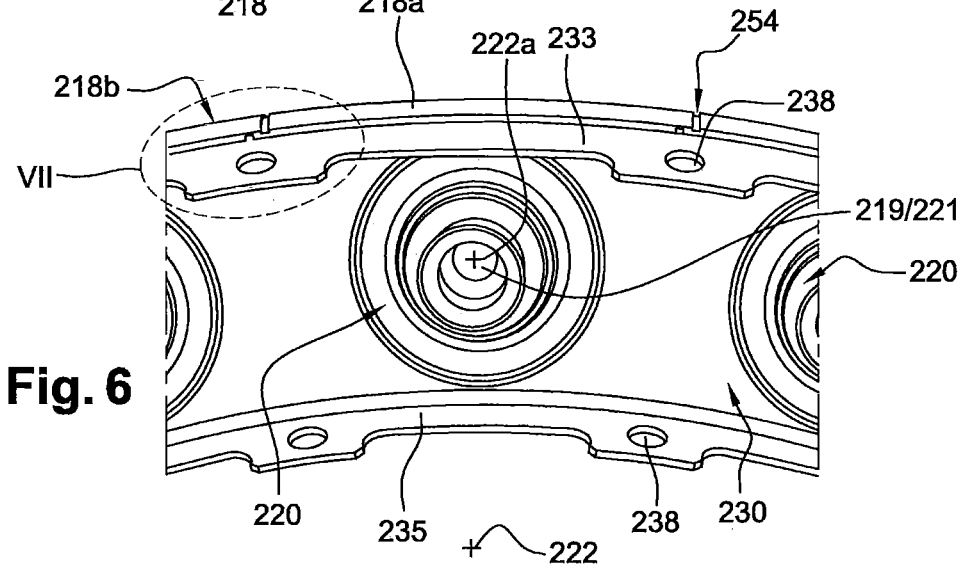
Figure 7:
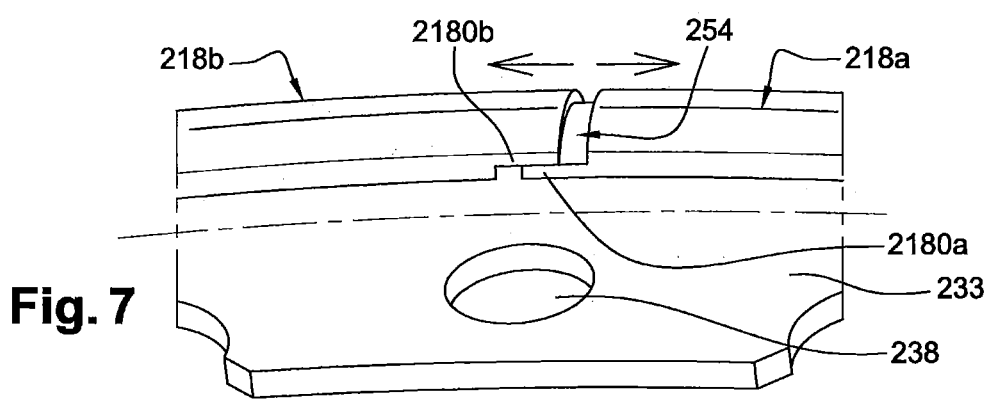

The invention will be better understood, if need be, and other details, characteristics and advantages of the invention will appear upon reading the following description given by way of a non restrictive example while referring to the appended drawings wherein:

FIG. 1 is a schematic axial cross-sectional half-view of a turbomachine combustion chamber of the prior art, FIG. 2 is an identical view of a variant of the combustion chamber bottom of a combustion chamber of the prior art that can replace the chamber bottom of FIG. 1, FIG. 3 is a view corresponding to FIG. 2, representing one embodiment of a chamber bottom according to the invention, FIG. 4 is a larger scale schematic view of a part of FIG. 3, FIG. 5 is a schematic downstream perspective view, in the direction of arrow V in FIG. 3, of the two walls of the chamber bottom, to be imagined thus over 360°, FIG. 6 is a schematic upstream perspective view in the direction of arrow VI of FIG. 5, and FIG. 7 details area VII of FIG. 6.

DETAILED DESCRIPTION

FIG. 1 shows a combustion chamber 10 of an aircraft gas turbomachine 1 in accordance with the prior art. Turbomachine 1 has, upstream (AM) with respect to the overall direction of gas flow in the turbomachine (arrow 11), a compressor not shown, in which air is compressed before being injected through a diffusion ring duct into a chamber housing not shown (phantom lines 5) and then into the combustion chamber 10 mounted in this housing. The compressed air is fed into the combustion chamber 10 and mixed with fuel before coming from injectors 12. The gases from the combustion are directed to a high pressure turbine not shown, located downstream (AV) of the outlet of chamber 10. Combustion chamber 10, which is of the annular type, comprises a radially inner annular wall 14 and a radially outer annular wall 16, whose upstream ends are connected by a substantially radially extending bottom wall 18. The bottom wall 18 has a plurality of axial openings 19 configured to serve for mounting fuel injection devices 20 into which are intended to engage fuel injector heads 12. Holes 140 and 160, for the circulation of dilution and/or cooling air can pass through the inner 14 and/or outer 16 walls, respectively.

The radially inner wall 14 and the radially outer wall 16 may be substantially coaxial to each other and parallel to the axes, parallel to each other, 22 and 22a, axis 22a belonging to the sectional plane and being the alignment axis of the fuel injection device 20 as shown.

The axis referenced 22 is the one around which the combustion chamber 10 develops annularly. What is "radial" in the description is what is substantially perpendicular to axis 22.

The bottom of combustion chamber 10 also has baffles 21 mounted downstream of the bottom wall 18 to protect it from the flame formed in combustion chamber 10 in the volume 15 defined between the walls 14,16. The baffles 21 are arranged adjacently by their radial edges so as to form an annular ring of baffles 21 protecting the bottom wall 18.

The bottom wall 18 has multi-perforations 28 for the passage of air from the compressor into the annular space 30 between the bottom wall 18 and the baffles 21. The ventilation of the bottom wall 18 is therefore not homogeneous over its entire circumference.

The chamber bottom 110 in FIG. 2 differs from the previous one, in particular in that it does not include a baffle plate and instead comprises an annular plate 130 which is mounted upstream of the downstream wall 118, parallel to and at a distance from it. The bottom downstream wall 118 differs from that 18 above in that it does not comprise multi-perforations. Like the upstream plate 130, the downstream wall comprises, parallel to axis 122 of the combustion chamber 10, an annular row of openings (119, 121 respectively) in which the injection devices 120 are mounted, the one of the section being centred on axis 122a parallel to axis 122, the latter corresponding to axes 22a and 22, respectively. The downstream wall 118 comprises at its outer periphery an annular upstream flange 132 (which may be substantially cylindrical) for attachment to the upstream end of the outer wall of the chamber, and at its inner periphery an annular upstream flange 134 (which may be substantially cylindrical) for attachment to the upstream end of the inner wall of the chamber. These walls are secured by means of screw-nut type means which pass through radial holes 136 in these walls.

The upstream and downstream walls 130, 118 delimit an annular air circulation cavity 140 between them. The upstream wall or plate 130 comprises multi-perforations 139 for the passage of air to impact the downstream wall 118 for cooling and to supply air to the cavity 140 extending between the upstream and downstream walls 130, 118.

In order to try to overcome at least part of the problems and disadvantages mentioned above, it is in the proposed invention that the downstream wall of the chamber bottom be sectorised.

In FIGS. 3-7, which illustrate an embodiment of the invention, the identical parts, and/or identical functions, to those presented in relation to FIG. 2 have the same mark, increased by 100.

More precisely, in relation to these FIGS. 3-7, the invention therefore provides a chamber bottom 210 comprising an upstream wall 230 and a downstream wall 218 extending between said inner and outer annular walls and comprising respective openings 221, 219 for arranging, parallel to the axis 222 of the chamber, fuel injection devices 220 for injecting fuel through said openings, and thus through a sectorised downstream wall 218.

When the combustion chamber 10 is in operation, each downstream wall sector 218 downstream is thus able to follow radially the expansion of the upstream wall 230 and to expand tangentially (circumferentially). Since the upstream and downstream walls are preferably crowns, the outside and inside diameters of the downstream wall 218 will remain equal to those of the upstream wall 230 and will improve the service life compared to a downstream wall which would be a continuous crown over 360°.

Both the upstream wall 230 and the downstream wall 218 can be metallic, typically the same steel.

The downstream bottom wall 230 comprises at its outer periphery an annular upstream flange 233 (which may be substantially cylindrical) for attachment to the upstream end of the outer wall 16 of the chamber, and at its inner periphery an annular upstream flange 235 (which may be substantially cylindrical) for attachment to the upstream end of the inner wall 14 (FIG. 1) of the chamber. These walls are secured by means of screw-nut type means which pass through holes 238 in the upstream wall 230 radial to the general axis 223 of the gas turbomachine 1. The downstream wall 218 has an upstream annular flange 232, 234 (which may be substantially cylindrical) at each of its outer and inner peripheries. As can be seen in FIGS. 3-4, the outer flange 232 of the downstream wall 218 is tightly seated (shrunk) radially to axis 223, on an outer cylindrical surface of flange 233 of the upstream wall 230, and its inner flange 234 is similarly tightly seated on an inner cylindrical surface of flange 235 of the upstream wall 230. The downstream wall 218 should preferably be radially pre-stressed to ensure a seal between these flanges at their inner and outer peripheries.

Drilled spacers or washers 241, having the same thickness as the upstream annular flanges 232, 234, may be interposed between the annular flanges 233, 235 and the radially inner wall 14 and radially outer wall 16. For fixing to these inner and outer walls, screws 242 will pass through holes 238 and spacers 241, but without passing through the downstream wall 218.

The forces and stresses between walls 14, 16 and chamber bottom 210 will then pass through the upstream wall 230.

For a compromise between thermal protection, shrink-wrapped assembly, mass and mechanical strength, it is recommended that the upstream wall 230 has a thickness which is generally equal to, within 10%, or greater than the thickness of the downstream wall 218.

Mounted along the axis of opening 221 in the upstream wall, and sectorised as indicated above, the downstream wall 218 will be able to define an effective thermal protection for the upstream wall 230, this upstream wall being thus structural for the combustion chamber.

The upstream wall 230 includes multi-perforations 239 through which air will impact the downstream wall 218 for cooling and to supply air to cavity 240. As can be seen in FIG. 3 or 4, the downstream wall 218 may consist of an outer annular row of slots 239 and an inner annular row of slots 243 for evacuating the air contained in cavity 240. Slots 239, 243 are intended to provide an air film along the outer and inner walls 16, 14, respectively, of the chamber.

For the mounting of the injection devices 220, and as can be better seen in FIG. 4, a two-part ring 244a, 244b is engaged in each opening 219, 221 and closes cavity 240 on the inside. The parts 244a, 244b are brazed, respectively, on the circumference of openings 219, 221. A sleeve 246 is mounted in the ring, coaxially to it. The sleeve 246 has a cylindrical flange 248 on its outer periphery which faces upstream and on which a flanged washer 250 is to be fitted and fixed. Along local axis 222a, there is an annular space between the washer 250 and an intermediate flange 252 of the sleeve in which an outer annular flange 220a of one of the injection devices 220 is accommodated and can slide in the radial direction to compensate for differential thermal expansions during operation. The washers 250 are attached and fixed to the sleeves 246.

In order to prevent circumferential expansions of each downstream wall sector 218 downstream during operation from inducing upstream wall 230 protection failures and/or fluid leakage, it is proposed that the downstream wall sectors 218 downstream overlap circumferentially (zone 254 FIGS. 6-7). Such a said sector, 218b in FIGS. 5-7, of the downstream wall may then cover a circumferentially adjacent sector, such as 218a, of this wall. Thus, an outer edge 2180b, circumferential or lateral, of a first sector 218b may then radially overlap an inner edge 2180a, circumferential or lateral, of a second circumferentially adjacent sector 218a. A play (see arrows in FIG. 7) in the circumferential direction will then exist between the angular sectors 218a, 218b . . . . If the flanges are additionally open upstream and downstream, a slight relative movement substantially axial between the sectors and in relation to the upstream wall 230 may also occur; see FIG. 7.

In order to best control the play(s) to be expected, it is also proposed to predefine, at the design stage, the expected hot circumferential deformation(s) of these sectors of the downstream wall 218. From these reference data (in dimensions or even shapes), it will be advantageous if the circumferential overlap 254 by one said sector (218b) of a said adjacent sector (218a) of the downstream wall is predefined as greater than the predefined deformation (play).

As already mentioned, the upstream and downstream walls 218 are, per downstream wall sector, crossed by coaxial openings, for example those 219/221 of axis 222a FIG. 6. In this double opening, one of the devices 220 for injecting fuel into (the volume 15 of) chamber 10 is therefore mounted axially. Still in connection with the above-mentioned existing differential expansions, with the turbomachine in operation, each sector, such as 218a, will be favourably circumferentially centred with respect to the axis (such as 222a) of the relevant opening 221 of the upstream wall 230.

And similarly in terms of mechanical effect, it may also be found appropriate that the (or at least some of the) screw fastening holes 238 of the upstream wall 230 with the inner and outer annular walls should be angularly (circumferentially) located opposite the respective circumferential overlaps 254; see FIGS. 6-7.

The invention claimed is:

1. A gas turbomachine having a combustion chamber, the combustion chamber comprising:
   two walls which are an inner wall and an outer wall, respectively,
   a chamber bottom comprising an upstream wall and a downstream wall extending between said inner wall and outer wall and comprising mounting openings for mounting fuel injection devices for injecting fuel through said mounting openings, the downstream wall having sectors, and, wherein, for a support on the upstream wall, the downstream wall comprises:

at an outer periphery of the downstream wall, a first upstream facing annular flange, and, at an inner periphery of the downstream wall, a second upstream facing annular flange, wherein the upstream wall comprises:

at least one hole passing through the upstream wall and adapted to receive fixation means for fixing the upstream wall to the outer wall, at an outer periphery of the upstream wall, a third upstream facing annular flange for attachment to an upstream end of the outer wall, and at an inner periphery of the upstream wall, a fourth upstream facing annular flange for attachment to an upstream end of the inner wall, and wherein the downstream wall is fixed to the upstream wall by the first and second upstream facing annular flanges of the downstream wall being respectively shrunk around and contacting the third and fourth upstream facing annular flanges of the upstream wall.

2. The gas turbomachine according to claim 1, wherein the first, second, third and fourth upstream facing annular flanges are cylindrical.

3. The gas turbomachine according to claim 1, wherein the upstream wall and the downstream wall are metallic.

4. The gas turbomachine according to claim 1, wherein the downstream wall defines a thermal protection for the upstream wall, said upstream wall being structural for the combustion chamber.

5. The gas turbomachine according to claim 1, wherein the upstream wall has an overall thickness equal to, to about 10%, or thicker than a thickness of the downstream wall.

6. The gas turbomachine according to claim 1, wherein the upstream wall is screwed with the inner wall and outer wall, respectively.

7. The gas turbomachine according to claim 1, wherein each sector of said sectors of the downstream wall has a circumferential overlap with a circumferentially adjacent sector of said sectors of the downstream wall.

8. The gas turbomachine according to claim 7, wherein at least one predefined circumferential deformation of said sectors, considered individually and hot, is predefined and the circumferential overlap by each sector of said sectors with said circumferentially adjacent sector of said sectors is greater than said at least one predefined circumferential deformation.

9. The gas turbomachine according to claim 1, wherein two of said mounting openings, respectively in the upstream wall and the downstream wall, are coaxial, each mounting opening of said mounting openings in the upstream wall having an axis with respect to which a sector of said sectors of the downstream wall is circumferentially centered.

10. The gas turbomachine according to claim 7, wherein:

the at least one hole comprises holes for screw fastening of the upstream wall to the inner wall and the outer wall which are angularly located opposite the circumferential overlap of each sector of the sectors, two of said mounting openings respectively in the upstream wall and the downstream wall are coaxial, each mounting opening of said mounting openings in the upstream wall having an axis with respect to which a sector of said sectors of the downstream wall is circumferentially centered.

11. The gas turbomachine according to claim 1, wherein the downstream wall is radially prestressed, thereby providing a seal between the first and third upstream facing annular flanges and a seal between the second and fourth upstream facing annular flanges.

12. The gas turbomachine according to claim 1, wherein the upstream wall and the downstream wall each include air passages extending therethrough.

13. The gas turbomachine according to claim 1, wherein:

the gas turbomachine has a general axis, the first upstream facing annular flange at the outer periphery of the downstream wall is tightly seated radially to said general axis on an outer cylindrical surface of the third upstream facing annular flange at the outer periphery of the upstream wall, and the second upstream facing annular flange on the inner periphery of the downstream wall is tightly seated radially to said general axis on an inner cylindrical surface of the fourth upstream facing annular flange at the inner periphery of the upstream wall.

14. The gas turbomachine according to claim 1, wherein the at least one hole does not pass through the downstream wall.

15. The gas turbomachine according to claim 1, wherein the combustion chamber further comprises at least one spacer and/or washer arranged between the upstream wall and the outer wall such that the at least one hole passes through the at least one spacer and/or washer.

* * * * *